June 7, 1932.  W. L. PATTERSON  1,862,031
MICROSCOPE
Filed Sept. 7, 1929   3 Sheets-Sheet 1
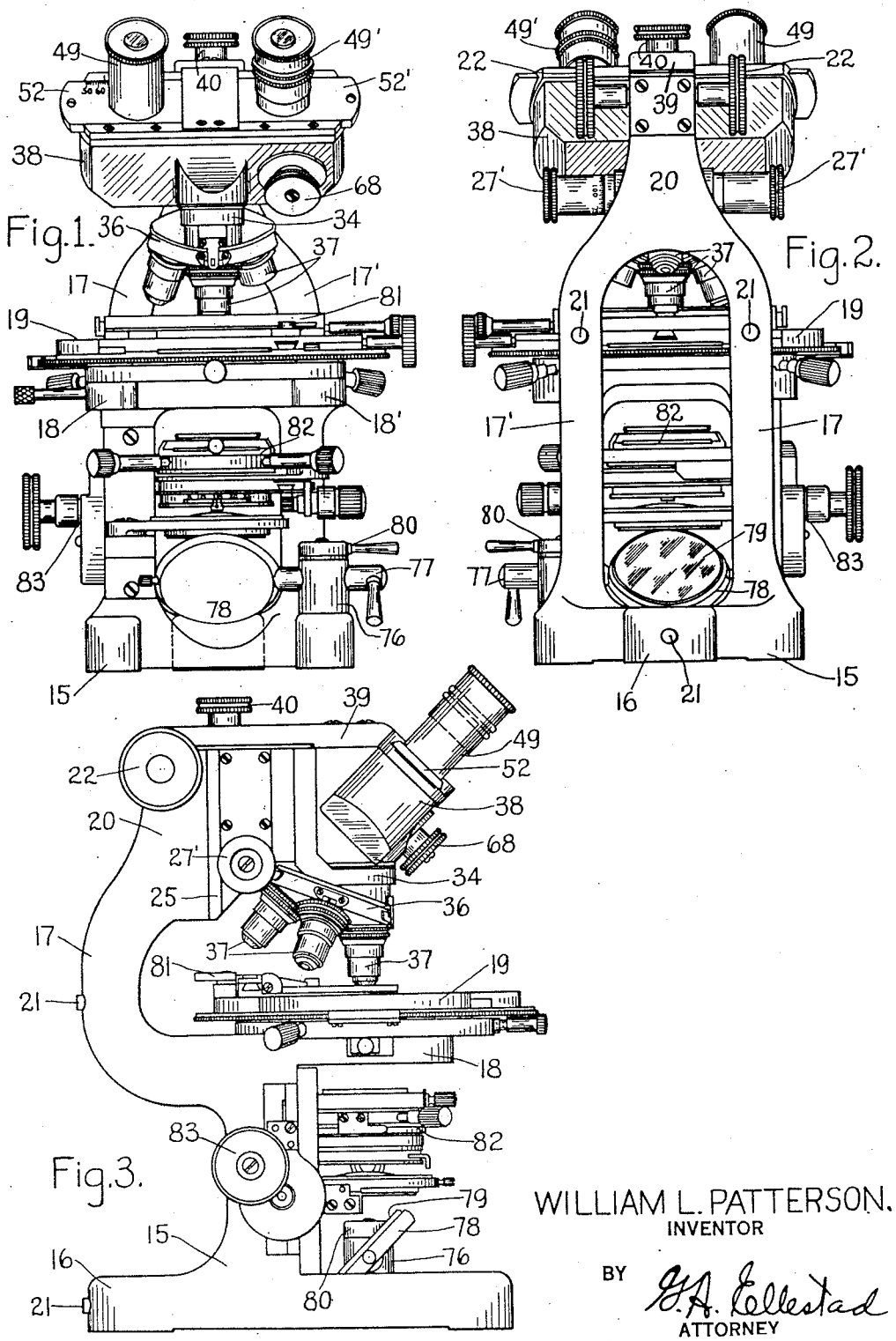
WILLIAM L. PATTERSON,
INVENTOR
BY G. A. Ellestad
ATTORNEY June 7, 1932.　　W. L. PATTERSON　　1,862,031
MICROSCOPE
Filed Sept. 7, 1929　　3 Sheets-Sheet 2

WILLIAM L. PATTERSON.
INVENTOR

BY *G.A. Ellestad*
ATTORNEY

June 7, 1932. W. L. PATTERSON 1,862,031
MICROSCOPE
Filed Sept. 7, 1929 3 Sheets-Sheet 3
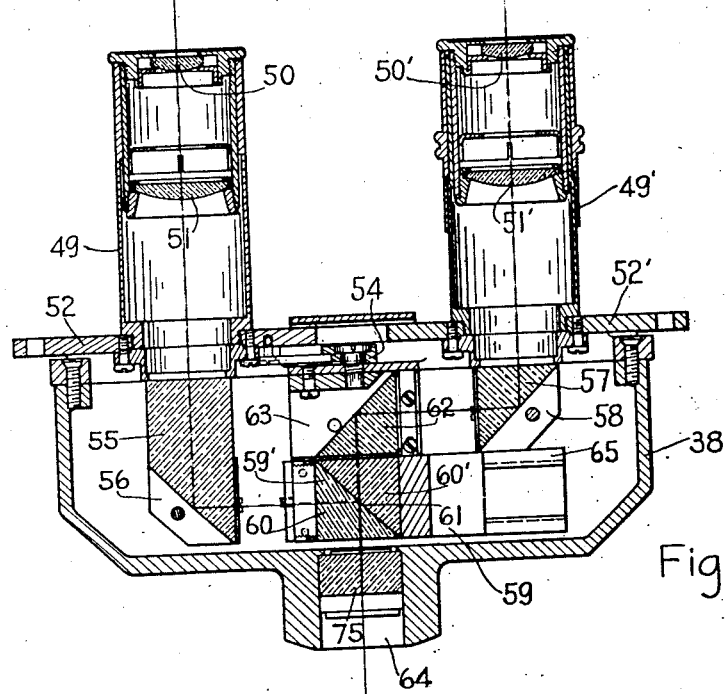
Fig. 7.
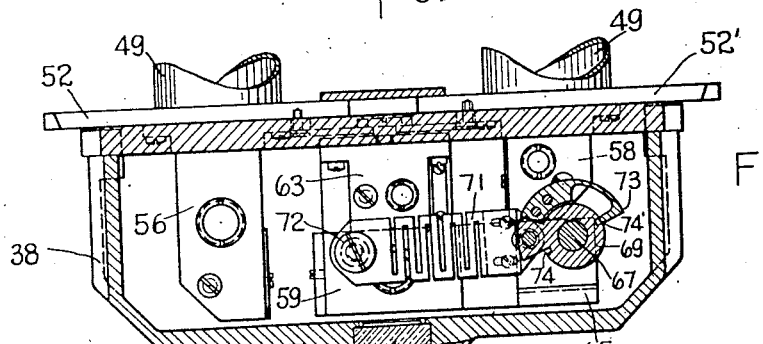
Fig. 8
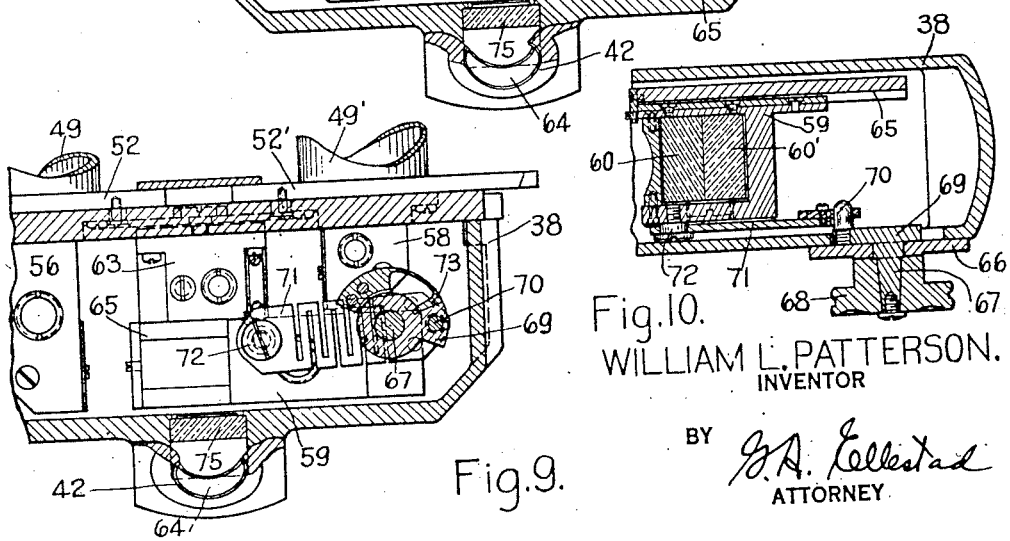
Fig. 10.
Fig. 9.
WILLIAM L. PATTERSON.
INVENTOR
BY *G. A. Ellestad*
ATTORNEY Patented June 7, 1932

1,862,031

UNITED STATES PATENT OFFICE

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK

MICROSCOPE

Application filed September 7, 1929. Serial No. 391,046.

This invention relates to microscopes and has for its principal object the provision of an improved microscope which can be readily manipulated, adjusted and used with a maximum degree of ease and convenience. Another object is to provide a microscope having a stand which will permit illumination from the rear side of the instrument so that when in use the stand of the instrument will be on the side remote from the user thereby affording free access to objects on the stage and allowing easy manipulation and adjustment of the instrument. Still another object is to provide a microscope with improved means whereby it may be readily altered and adapted for either binocular or monocular observation. Another object is to provide a microscope in which the weight of the adjustable lens holding means is counterbalanced by a yieldable member; and a further object is to provide an improved microscope stand whereby the instrument may be readily positioned with the optical axis of the objective in a horizontal plane.

These and other objects and advantages reside in certain novel features of construction, arrangement and combination of parts as will hereinafter be more fully explained and pointed out in the appended claims.

Referring to the drawings:

Fig. 1 is a front view in elevation of my improved microscope.

Fig. 2 is a rear view of same.

Fig. 3 is a side view as seen from the left of Fig. 1.

Fig. 7 is a vertical sectional view of the binocular body taken on line 7—7 of Fig. 6.

Fig. 8 is a sectional view taken on line 8—8 of Fig. 6 showing the elements in position for binocular observation.

Fig. 9 is a fragmentary view of the same but showing the elements in position for monocular observation.

Fig. 10 is a fragmentary sectional view showing details of the prism moving mechanism.

Figures 4, 5:
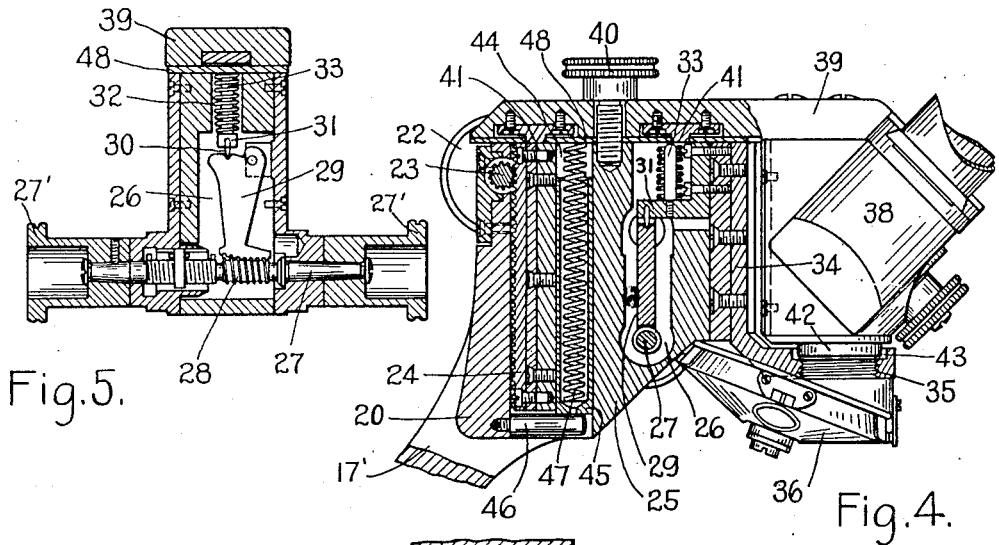
Fig. 4 is a fragmentary sectional view showing the mechanism for fine and coarse adjustments.
Fig. 5 is a sectional view showing the fine adjustment structure.
Figure 6:
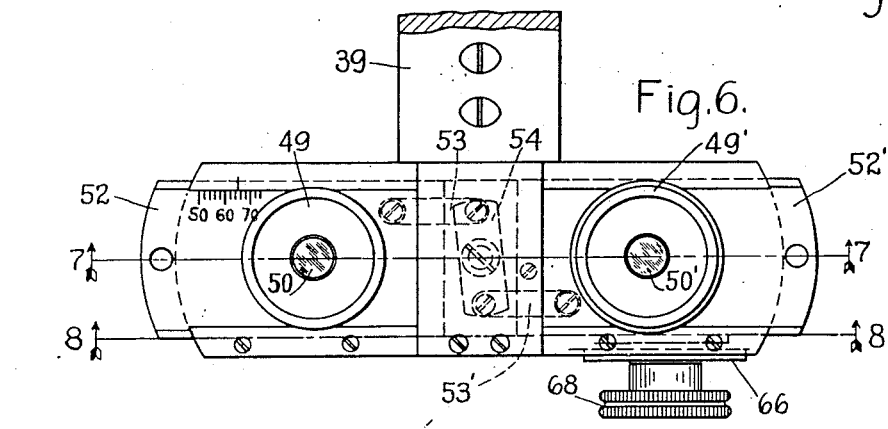
Fig. 6 is a top plan view of the binocular body.

A preferred embodiment of the invention is shown in the drawings wherein 15 indicates generally a U-shaped base having a rearwardly projecting heel portion 16. Rising vertically upward from the base and integral therewith are the two spaced pillars 17 and 17' which have integral forward projections 18 and 18' for supporting the stage indicated generally at 19. From the level of the stage support the two spaced pillars 17 and 17' project rearwardly and thence upwardly and forwardly to a common point where they are united to form a supporting bracket 20. The stand of the instrument comprising base, pillars and stage support is preferably formed of a single integral casting. Supporting studs 21, with their surfaces all in the same plane, are secured to the heel portion 16 and to the two pillars 17 and 17' as clearly shown in Fig. 2. Since the stand is formed of a single, rigid casting, the instrument may, if desired, be rested on the supporting studs 21 with the optical axis of the objective in a horizontal plane. This structure eliminates the overhang of optical parts when the instrument is used with a monocular body tube for photomicrography.

Rotatably mounted on the bracket 20, and arranged to be turned by knobs 22, is the pinion 23 which cooperates with the rack 24 which is attached to the block 25. Mounted within a recess 26 in block 25 is a fine adjustment mechanism of the type described in the United States Patent No. 1,123,583 issued to me on January 5, 1915. This mechanism comprises a rotatable shaft 27 adapted to be turned by knobs 27' and having a threaded portion 28 cooperating with the pivotally mounted gear segment 29. A pin 30, carried by the movable member 31, is held in contact with segment 29 by means of the spring 32 which encircles pin 33. The member 31 carries the bracket 34 into which is threaded, as at 35, the nose piece 36 which carries objective lenses 37 of different powers. From this description it will be apparent that a fine adjustment of the objective lenses 37 can be secured by turning knobs 27'. As clearly shown in Fig. 3, the nose piece 36 is so positioned that the objectives 37 which are not in use are positioned rearwardly of the objective which is in use thereby permitting free access to the object on the stage.

The binocular body, to be hereinafter more fully described and indicated generally at 38, has a laterally projecting supporting arm 39 whereby the body is detachably secured to block 25 by means of screw 40. Aligning projections 41, attached to arm 39, cooperate with openings on the block 25 to insure proper positioning of the body. A tube 42 projects downwardly from the body 38 and into an oversize opening 43 in bracket 34 whereby light rays may pass from the objective lens up into the body 38. The binocular body 38 is therefore supported solely by the arm 39 attached to block 25 so that the body is not in contact with the bracket 34 which supports the objective lenses 37. Hence it will be apparent that by turning the fine adjustment knob 27' only the bracket 34 together with nose piece 36 and lenses 37 are moved and that by turning coarse adjustment knob 22 the entire block 25, body 38 and lenses 37 are moved. This structure relieves the delicate fine adjustment mechanism from carrying the relatively heavy binocular body and so lessens the chance of the microscope getting out of focus due to the undue strain on the fine adjustment mechanism.

Mounted for free slidable movement within the opening 44 in block 25 is a tube 45 having a closed lower end which rests on a pin 46 which is secured to bracket 20. Mounted within tube 45 is a coil spring 47 which is placed under tension by confining it by means of a plate 48 which is secured to the top of block 25. Since the lower end of the spring rests on pin 46 carried by bracket 20, the spring constantly exerts a pressure which tends to raise the block 25 upwardly with respect to the bracket 20. Hence the spring 47 tends to counterbalance the weight of block 25 with body and lenses attached so that the force applied to adjusting knobs 22 is substantially the same whether raising or lowering the block 25.

The binocular body 38 comprises an enclosed casing on the top of which are mounted the two parallel eye piece tubes 49 and 49' carrying lens elements 50, 51 and 50', 51', respectively. The tubes 49 and 49' are mounted, respectively, on slidable members 52 and 52' which are pivotally connected by links 53 and 53' to the pivotally mounted link 54 whereby the two eye piece tubes are simultaneously moved towards or from each other by equal amounts when adjustments are made for varying pupillary distances.

A reflecting prism 55 is fixedly secured to the under side of slide 52 by means of mounting 56 and a reflecting prism 57 is secured to the under side of slide 52' by means of mounting 58. Secured in a slidable mounting 59 is the light-dividing means 59' comprising two prisms 60 and 60' with an intervening half-platinized or silvered surface 61 adapted to transmit substantially one-half of the light rays which reach it and to reflect the other half. A reflecting prism 62 held in mounting 63 is fixedly positioned above the light-dividing means and in alignment with the centrally disposed opening 64 through which light rays are received from the objective. Hence, with the prisms in position as shown in Fig. 7, a half of the light rays passing through opening 64 will be reflected laterally by surface 61 to the prism 55 which in turn will direct the rays up into the eye piece tube 49 whereas the other half of the rays will pass through the semi-silvered layer 61 and will be reflected by prism 62 to prism 57 and thence into eye piece tube 49' thereby providing means for binocular observation.

The mounting 59, carrying the light-dividing means 59', is slidably secured to a track 65. Rotatably mounted on a plate 66 attached to the front wall of body 38 is a stub shaft 67 which is provided with the operating knob 68. Attached to the inner end of shaft 67 is the cam member 69 having a pin 70 connected with one end of a link 71, the other end of the link 71 being pivotally connected to mounting 59 by means of screw 72. Mounted on the inner face of plate 66 is a spring pressed finger 73 which is adapted to cooperate with the detents 74 and 74' on cam member 69 to selectively hold the mounting 59 in its adjusted position.

Figure 11:
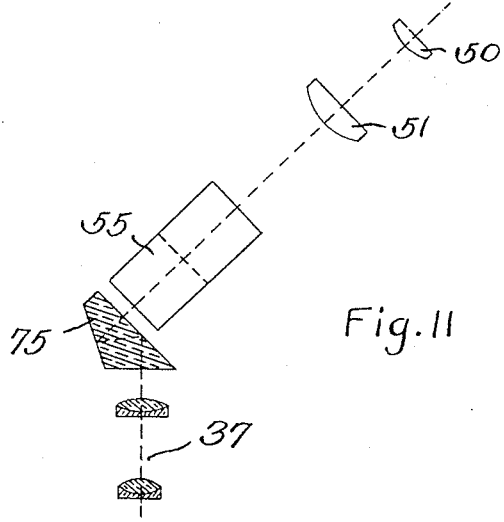
Fig. 11 is a diagrammatic view showing the path of light rays from the objective into the inclined eye piece body.

From the foregoing it will be apparent that by turning the knob 68 the light-dividing means 59' may be selectively brought into or out of alignment with the opening 64 to adapt the instrument for either binocular or monocular observation. The elements are shown in position for binocular use in Figs 7 and 8 with the light rays indicated by the dash lines in Fig. 7, while Fig. 9 shows the light-dividing means 59' moved out of alignment so that all light rays passing from the objective through the opening 64 are successively reflected by prisms 62 and 57 into the eye piece tube 49' to provide monocular observation. As shown in Fig. 3, the plane of the optional axes of the eye piece tubes is inclined to the optional axis of the objective 37 when the binocular body is used on the instrument. A reflecting prism 75 is accordingly positioned in opening 64 so that light rays passing through the objective 37 will directed into the plane of the optional axis of the eye piece tubes 49 and 49'. The pa of the light rays which pass from objective 37 through prism 75 and into the inclined eye pieces is indicated by the dash lines in Fig. 11.

On the base 15 there is mounted, for rotation about a vertical axis, the lug 76 in which is rotatably mounted a rod 77 carrying a mounting 78 for the mirror 79. A lock nut 80 serves to retain the mirror in adjusted position.

The stage supports 18 and 18' carry a rotatable stage 19 of a well known type which may be provided with a detachable mechanical stage indicated generally at 81. The instrument is also provided with the usual substage equipment indicated at 82 having means 83 for raising and lowering the same. These elements form no part of the present invention and so a detailed description of same is omitted.

In using my improved microscope, the stand of the instrument will be located on the side remote from the user, as will readily be apparent from Fig. 3. The reflecting surface of the mirror 79 will be turned rearwardly and the opening formed by the spaced pillars 17' and 17' will permit light rays to strike the mirror and be reflected into the objective lens 37. This arrangement, which is an important feature of my invention, allows the user to have free and unobstructed access for the purpose of manipulating and adjusting the object on the stage. Such a convenient manipulation is not possible with instruments of the prior art since the stand of such an instrument in use is adjacent to the user and so prevents unobstructed access to the object on the stage. The nose piece of my improved microscope is so constructed that the objectives which are not in use are out of the way and so do not prevent ready access to the stage.

The microscope may be quickly and conveniently adapted for either binocular or monocular observation by merely turning the knob 68. The binocular body 38 may be detachably removed from the instrument by unscrewing the retaining screw 40 and a monocular body tube (not shown) may be secured to the instrument in place of the binocular body. Because of the rigid structure of the stand, the instrument may be rested on the supporting studs 21 so that the optical axis of the objective is horizontal. This feature adapts the instrument, when used with a monocular body tube, for use in taking photomicrographs of specimens. The various features of construction and use and the convenience and ease of manipulation render the instrument especially adaptable to the needs of the research worker.

From the foregoing it will be apparent that I am able to attain the objects of my invention and provide an improved type of microscope having the features and advantages hereinbefore described. Various modifications and adaptations can obviously be made without departing from the spirit of my invention as pointed out in the appended claims.

I claim:

1. A microscope comprising a base, two spaced pillars extending vertically from said base thence rearwardly, upwardly and forwardly to a point where they are joined together to form a supporting bracket, a lens system mounted on said bracket and reflecting means positioned on said base to direct into said lens system light rays which pass between said spaced pillars.

2. A miscroscope comprising a base, spaced pillars extending upwardly from said base to form a supporting bracket, a lens system carried by said bracket and reflecting means mounted on said base, said reflecting means facing the plane of said pillars there being free space between said means and said plane whereby light rays passing between said pillars will be reflected into said lens system.

3. A miscroscope comprising a base, supporting means mounted on said base, said supporting means having an opening, a lens system carried by said supporting means, reflecting means mounted on said base, said reflecting means facing said opening whereby light rays passing through said opening are reflected into said lens system by said reflecting means.

4. A microscope comprising a base, spaced vertical pillars on said base, a lens system carried by said pillars, inclined reflecting means mounted directly on said base for directing light rays into said lens system, said reflecting means facing the plane of said pillars whereby light rays which pass between said pillars will be reflected into said lens system.

5. A microscope comprising a base, a plurality of spaced pillars extending vertically upward from said base to form a stage support, said pillars extending rearwardly from said support and thence upwardly and forwardly to a point where they are joined together to form a supporting bracket, a lens system carried by said bracket, rearwardly facing reflecting means positioned on said base whereby light rays passing between said pillars will be reflected into said lens system.

6. A microscope comprising a base having a heel portion, spaced pillars extending upwardly from said base, thence rearwardly to form rearward extensions and thence upwardly to a point where they are joined together to form a supporting bracket, a lens system carried by said bracket, supporting surfaces on said heel portion and on said extensions whereby the microscope may be supported with the optical axis of said lens system in a substantially horizontal position.

7. A microscope comprising a base, spaced pillars extending vertically upward from said base thence rearwardly and upwardly to a point where they are joined together to form a supporting bracket, a lens system carried by said bracket, said lens system comprising an objective lens, a pair of spaced eye pieces and reflecting means positioned between said lens and eye pieces, a rearwardly facing mirror mounted on said base for directing light rays into said objective lens, said eye pieces being forwardly inclined away from the vertical plane passing through said pillars.

8. In a microscope, the combination of a support, lens holding means mounted for vertical movement on said support, means for moving said lens holding means, and yieldable means coacting to urge said lens holding means upward, said yieldable means being mounted on said support.

9. In a microscope, the combination of a support, lens holding means mounted for vertical movement on said support, said lens holding means comprising an objective lens carrier and means for moving said carrier, mechanism for moving said lens holding means and yieldable means acting to urge said lens holding means upward, said yieldable means being mounted on said support.

10. In a microscope, the combination of a support, lens holding means movably mounted on said support, a rack carried by said means, a pinion rotatably mounted on said support for engagement with said rack whereby said lens holding means can be vertically adjusted, a yieldable member carried by said support, said yieldable member being in coacting relation with said holding means to urge said means upward.

11. In a microscope, an optical system comprising two spaced eye pieces, an objective lens positioned in a plane between said eye pieces, reflecting means associated with each eye piece, a reflecting prism fixedly positioned above said objective, a light-dividing means between said objective and said prism, said light-dividing means comprising a surface for transmitting and reflecting light rays, said light-dividing means being selectively movable into and out of cooperative relation with said objective whereby light rays coming from said objective may be either divided and directed into both eye pieces or directed into only one eye piece.

12. A microscope comprising a base, a support secured to said base, an eye piece body carried by said support, said body having an optical system, a movable nose piece mounted on said support to move about an axis inclined to the vertical, a plurality of objective lenses carried by said nose piece adapted to be selectively positioned for cooperative use with said optical system, the optical axis of the objective in use lying in a substantially vertical plane, the objectives which are not in use being positioned between said support and the objective in use, a mirror on said base, said mirror being rearwardly faced to reflect into the objective in use light rays emanating from points rearward of a vertical plane passing through the axis of the objective in use.

13. In a microscope, the combination of a support, an eye piece body carried by said support, said body having an optical system, a movable nose piece carried by said support and mounted to turn about an axis inclined to the vertical, said nose piece carrying a plurality of objectives which are adapted to be selectively positioned for cooperation with said optical system, the objectives which are not in use being positioned between the planes of said support and the objective in use.

14. In a microscope, the combination of a substantially vertical stand, an eye piece on said stand, the optical axis of said eye piece being inclined away from a vertical plane passing through said stand, a bracket mounted on said stand, said bracket having an opening whose axis lies in a vertical plane, optical means for directing light rays from said opening into said eye piece, a movable nose piece mounted on said bracket, a plurality of objectives carried by said nose piece whereby each of said objectives may be selectively positioned in alignment with said opening, the objectives which are not in alignment with said opening being positioned between said stand and a vertical plane passing through the axis of said opening.

15. A microscope stand formed of a single, integral casting, said stand comprising a U-shaped base having a rearwardly extending heel portion, spaced vertical pillars extending upwardly from said base to form a stage support, said pillars extending rearwardly from said support, thence upwardly and forwardly to a point where they are joined together to form a lens supporting bracket.

16. In a microscope, the combination of a binocular body having two eye pieces mounted thereon, said body having a centrally disposed opening through which light rays may pass from an objective, reflecting devices associated with each of said eye pieces, light-dividing means slidably mounted in said body, means for selectively moving said light-dividing means into operative position above said opening, said last named means comprising a rotatable member and a pivoted link.

17. A microscope comprising a stand, an eye piece body carried by said stand, an optical system in said body, a movable nose piece carried by said stand, a plurality of objectives mounted on said nose piece and adapted to be selectively positioned for cooperative use with said optical system, the optical axis of the objective in use being positioned in a vertical plane, said nose piece being mounted to turn about an axis which is located between said stand and said vertical plane.

18. A microscope having in combination a stand carrying a member having an opening, the axis of said opening lying in a substantially vertical plane, a nose piece rotatably mounted on said stand, said nose piece carrying a plurality of objectives adapted to be selectively aligned with said opening, the axis about which said nose piece rotates being inclined to the vertical and located between said plane and said stand whereby the objectives which are not in alignment with said opening are positioned between said opening and said stand.

19. A microscope comprising a stand having a vertically disposed bracket portion, a stage carried by said stand in front of said bracket portion, an eye piece body carried by said bracket portion, said body being positioned above said stage, a pair of eye pieces mounted on said body, said eye pieces having their optical axes inclined toward the front and away from the vertical plane of said bracket portion.

20. A microscope having in combination a stand, a block slidably mounted on said stand, an L-shaped bracket slidably mounted on said block, said bracket having a countersunk opening, an objective carried by said bracket in alignment with said opening, an eye piece body having a projecting arm, said arm being secured to said block, said body having a depending tube which projects into said countersunk opening.

21. A microscope comprising a base, supporting means extending upwardly from said base, an optical system carried by said supporting means, said base and said supporting means having supporting surfaces which lie in a substantially vertical plane whereby the microscope may be supported on said surfaces with the optical axis of said system in a substantially horizontal position.

22. A microscope comprising a base, supporting means mounted on said base, said means having an opening, an optical system carried by said supporting means, said system comprising an ocular and an objective, the optical axis of said ocular being inclined forwardly, and reflecting means supported by said base, said reflecting means being faced rearwardly toward said opening whereby light rays passing through said opening are reflected into said optical system.

23. A microscope comprising a support having an opening, an eye piece body carried by said support, an ocular in said body, a plurality of objectives carried by said support, said objectives being movably mounted whereby they may be selectively positioned for cooperative use with said ocular, the objective in use having its optical axis in a vertical plane, each objective not in use being positioned between said support and said plane and reflecting means carried by said support, said reflecting means being faced toward said opening whereby light rays which pass through said opening are reflected into the objective in use.

24. A microscope comprising a stand having an opening, an eye piece body carried by said stand, said body having an aperture whose axis lies in a vertical plane, a nose piece mounted below said body, said nose piece being rotatable about an axis which is inclined to the vertical and located between said vertical plane and said stand, a plurality of objectives mounted on said nose piece and adapted to be selectively aligned with said aperture, an ocular carried by said body, the optical axis of said ocular being inclined forwardly and away from said stand, optical means in said body for directing light rays from said objectives into said ocular and a reflector for directing light rays into said objectives, said reflector being faced rearwardly toward said opening.

WILLIAM L. PATTERSON.